Patented Mar. 20, 1923.

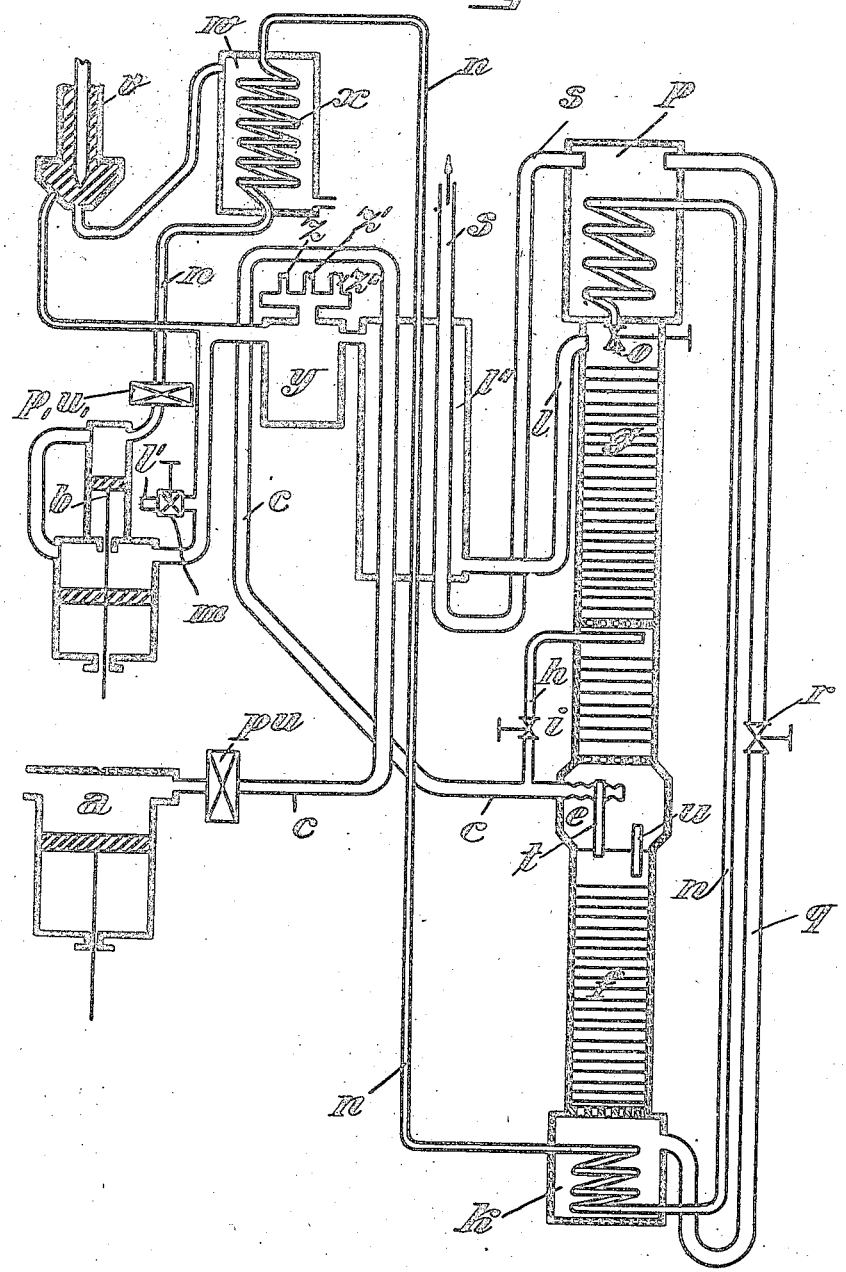

1,449,291

UNITED STATES PATENT OFFICE.

RUDOLF FERDINAND MEWES AND RUDOLF KARL EDUARD MEWES, OF BERLIN, GERMANY.

PROCESS FOR SEPARATING GAS MIXTURES UNDER PRESSURE.

Application filed August 4, 1922. Serial No. 579,654.

*To all whom it may concern:*

Be it known that we, RUDOLF FERDINAND MEWES and RUDOLF KARL EDUARD MEWES, residing at Berlin, Germany, have invented certain new and useful Improvements in a Process for Separating Gas Mixtures Under Pressure, of which the following is a specification.

This invention relates to a novel process for separating gas mixtures under pressure in a circulating system traversed by components with different boiling points.

In order to enable a considerable amount of useful mechanical effect to be recovered in the course of the process of separation under any desired pressure, the process according to the invention is carried out in such a way that the commercially pure nitrogen obtained in the separator rectifying column is conducted under the pressure of the separator through a heat exchanger and thus first reheated almost up to the temperature of its neighborhood and then caused to perform work in an expansion machine; or machines such as rock drills, rock mills, power hammers, machine tools, etc., of a piston or rotary pipe. When the gas is expanded the exhaust temperature of the expansion machine will drop, to considerably beneath 0°, say to 60 to 70° centigrade below zero. In addition to the mechanical work an appreciable amount of cold is thus obtained which, like the mechanical work, can be usefully employed for divers purposes or can also be turned to account in the separating process itself.

The nitrogen that issues from the heat exchanger may be heated, before it is expanded, far above its exhaust temperature by admitting heat into the process of heating by mixing or by surface heating. This heating may also be conveniently accomplished by means of the heat of compression of the air to be separated and of the compressed nitrogen. For heating to higher temperatures up to 300° C. and more, however, special heating devices are used which are heated by hot waste products of higher temperature or by fire gases. This method of carrying out the novel process offers the advantage that almost the entire work of compression can be recovered for the separation process and thus a considerable saving of mechanical work of compression (steam power, electric current, work from a driving shaft) can be effected because air superheated in this manner is capable of performing a greater amount of mechanical work.

The novel process offers the extraordinary advantage that it is not only capable of supplying the compressed oxygen properly mixed with air, required for the known nitrogen combustion furnaces operated by means of the electric arc, but that the nitrogenous gases that issue from the combustion furnace and have to be quenched or suddenly cooled are capable of heating the compressed nitrogen to higher temperatures than 300 to 400° C. in special air heaters on account of their high temperatures. The present process therefore offers the advantage that it enables oxygen and nitrogen to be obtained as a by-product and therefore cheaply. This is important because it enables commercial oxygen to be utilized for enriching the air used in blast and other furnaces in a highly economical manner, the waste heat from such furnaces being employed in the operation.

To enable the process to be started a container for compressed air or nitrogen is inserted in one of the pressure pipes, preferably before the place where expansion or superheating or heating takes place, and the cubical contents of this container is such that the process may be started and the used pressure medium nitrogen may be automatically replaced similarly as in a Diesel engine. By this means the advantage is gained that the plant is always ready for service.

The invention is illustrated in the drawing in which Figs. 1 and 2 are diagrammatic representations of installations for separating air into its chief components, oxygen and nitrogen, and for reheating the nitrogen, under the pressure of the separator or rectifying column, obtained in the separator or rectifying column, the said reheating being effected by a heat exchanger.

Fig. 2 shows a plant with a heat exchanger and an expansion machine, an arrangement for precooling the nitrogen under high pressure which is conducted into the evaporator of the rectifying column, and a pressure equalizer from which a plurality of branch pipes lead to several work machines.

Figure 1:
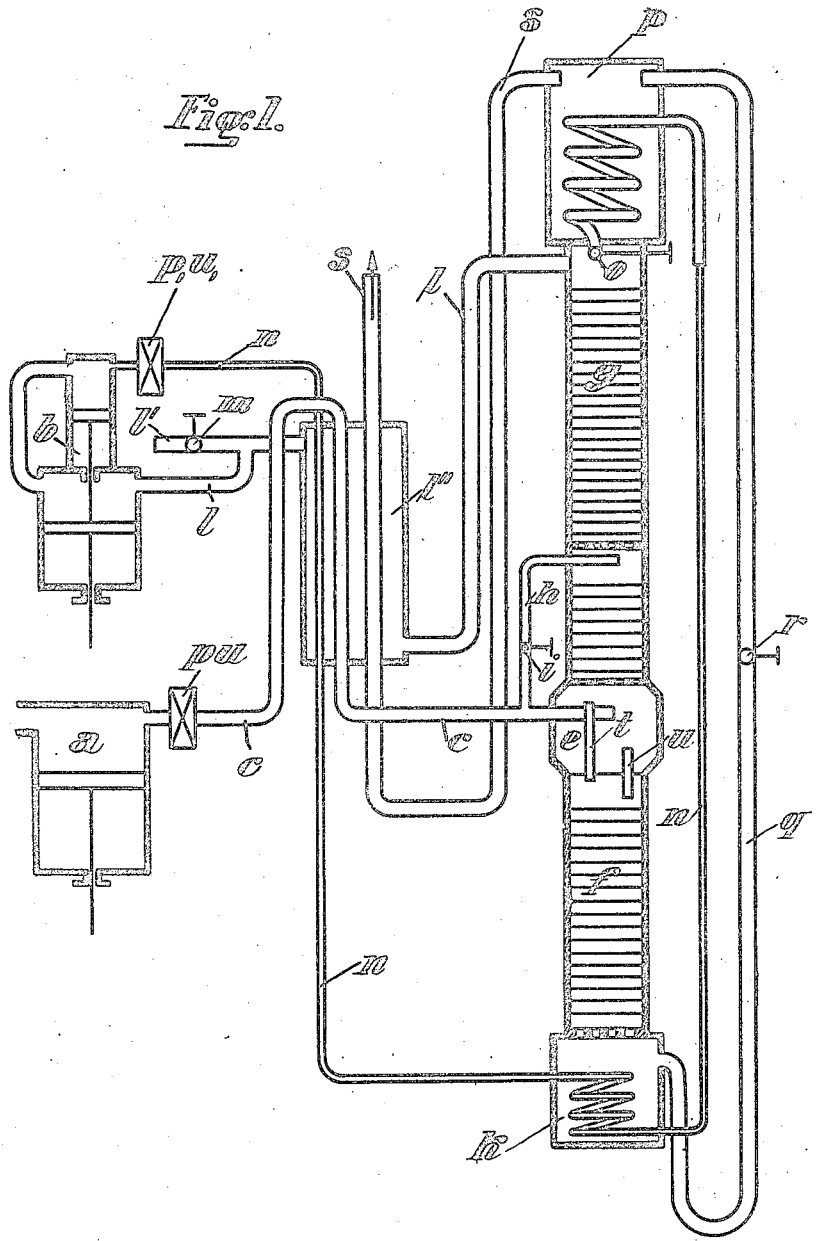
Fig. 1 is a diagrammatic view of a plant constructed in accordance with one form of this invention.

In the installation shown in Fig. 1 a low pressure compressor $a$ draws in air, which has been previously purified by any suitable means, and compresses the same, thus giving it the pressure (4 to 10 atmospheres) at which it is desired to separate it, and then drives the compressed air—after it has been purified in a purifier $pu$ and cooled in a heat exchanger $l''$ to a temperature corresponding almost to the temperature of liquefaction—through the pipe $c$ into the lower part of the dephlegmation column $g$ at $e$, or into the middle part of this column through a pipe $h$, which can be more or less closed by a valve $i$. From the upper part of the dephlegmation column the nitrogen is conducted into a heat exchanger $l''$, whose volume is such as to make it act as a pressure equalizer. The nitrogen is drawn from the heat exchanger $l''$ by high pressure compressor $b$. A part of the nitrogen that issues from the heat exchanger passes through a pipe $l'$. A throttle valve $m$ is used to control the flow of nitrogen through the pipe $l'$.

The gas (nitrogen) that issues at a high pressure from the high pressure compressor $b$ passes through a purifier $p$, $u$, a heat exchanger $l''$ and a pipe $n$ into the oxygen evaporator $k$ located beneath the evaporating column $f$ and finally into the upper oxygen evaporator $p$. Thence it passes into the rectifying column after its pressure has been reduced by an expansion valve $o$ to that which obtains in the column $g$. The nitrogen which is now in liquid state flows unto the top-most plate of the dephlegmation column $g$, accumulates in the chamber between the two columns $g$ and $f$, and finally overflows through the overflow pipe $u$ unto the top-most part of the evaporating column $f$ at whose lowermost part liquid oxygen accumulates at $k$ which partly evaporates and partly flows in a liquid state through the pipe $q$ and the throttle valve $r$ into the top evaporator $p$ where it expands. From the evaporator $p$ the oxygen is conducted in a gaseous form through the pipe $s$ that passes through the heat exchanger $l''$ and conducts the oxygen to the place where it is used, such as a blast furnace, lime furnace, Siemens Martin furnace or the like. The evaporating column $f$ is connected to the dephlegmation column $g$ by means of a pipe $t$.

The pressure which obtains in the rectifying column $g$, $f$ and in the pipes or passages $c$, $l'$ and in the heat exchanger $l''$ connected to the said column can easily be regulated as desired by the expansion or throttling device $m$, while the temperature of the expanded gas which has passed through the throttling device $m$ can be regulated by tapping this gas off at a point in the heat exchanger where the gas has been raised to a higher or decreased to a lower temperature. The said temperature of the expanded gas can also be lowered or raised by employing a higher or lower pressure in the rectifying column.

Instead of two compressors $a$ and $b$ a multistage compressor of a suitable capacity may be employed, the second or third stage of which draws in nitrogen of a low pressure through the pipe or heat exchanger $l''$ from the rectifying column $g$.

In the novel process as exemplified in Fig. 1 the expansion of the separated and more easily evaporated component of the gas mixture contrary to known rectifying processes, takes place after the nitrogen issuing from the rectifying column has been partly or completely reheated again in the heat exchanger, and after it has been branched off from the heat exchanger $l''$ at any desired point. The expansion or throttling device $m$ is preferably arranged outside of the heat exchanger. A very appreciable advantage of the present process consists in the possibility of preventing lubricants from passing from the low pressure expansion machine or throttling device $m$ into the rectifying column or gases circulating in the system because the particles of lubricant which the expanded gases carry along with them are conducted off with the nitrogen and thus cannot enter the rectifying column, so that a danger of explosion due to lubricants being carried into the rectifying column is completely eliminated.

The operations in the process diagrammatically illustrated in Fig. 2 are, on the whole, similar to those shown in Fig. 1. The only difference consists in the fact that the cold nitrogen gases that expand in the expanding machine $v$ are conducted into a precooling device $w$ in which the nitrogen compressed by the high pressure compressor $b$ is precooled and in the provision of a special pressure equalizer from which several branch pipes $z$, $z'$, $z''$ may lead to work machines, such as rock drills, etc. This highly compressed nitrogen is subjected to an intense precooling process in a cooling coil $x$ (which is preferably of a counter current type) cooled by the expanded nitrogen gases, that have a temperature of about 60 to 80° C. below zero, and is then conducted through the heat exchanger $l''$ and eventually through the pipe $n$ to the evaporator $k$. By this precooling process a more favorable exchange of heat is obtained the expansion valve $o$ is greatly relieved so that when the process is kept going for long periods the high pressure is lowered and the work of compression that has to be performed is lessened.

What we claim is:

1. That process for liquefying and separating oxygen and nitrogen gases which consists in compressing the mixed gases without liquefying the same, passing the compressed gases through a heat exchanger to cool them and conducting them into a dephlegmation column, allowing the gases to expand and ascend in said column in contact with descending liquid nitrogen whereby the oxygen loses heat and is cooled to the point of liquefaction and the nitrogen separates and ascends together with the nitrogen separated from the descending liquid, conducting the nitrogen gases out of the column at the pressure existing therein and leading them through said heat exchanger, compressing a portion of the nitrogen and again conducting it through the heat exchanger to partially cool it, conducting the compressed and partially cooled nitrogen through the accumulating liquefied oxygen, conducting the nitrogen thence to a condenser separate from the column, conducting the nitrogen from the condenser to the top of the column and permitting the same to expand to produce said descending liquid nitrogen.

2. That process for liquefying and separating oxygen and nitrogen gases which consists in compressing the mixed gases without liquefying the same, passing the compressed gases through a heat exchanger to cool them and conducting them into a dephlegmation column, allowing the gases to expand and ascend in said column in contact with descending liquid nitrogen whereby the oxygen loses heat and is cooled to the point of liquefaction and the nitrogen separates and ascends together with the nitrogen separated from the descending liquid, conducting the nitrogen gases out of the column at the pressure existing therein and leading them through said heat exchanger, compressing a portion of the nitrogen, cooling the compressed nitrogen and further cooling it by conducting it through the said heat exchanger, conducting the compressed and cooled nitrogen through the accumulating liquefied oxygen, conducting the nitrogen thence to a condenser separate from the column, conducting the nitrogen from the condenser to the top of the column and permitting the same to expand to produce said descending liquid nitrogen.

In testimony whereof we affix our signatures.

RUDOLF FERDINAND MEWES.
RUDOLF KARL EDUARD MEWES.